United States Patent
Zhang et al.

(10) Patent No.: US 12,153,186 B2
(45) Date of Patent: Nov. 26, 2024

(54) SIGNAL ACQUISITION METHOD AND DEVICE OF AZIMUTHAL ELECTROMAGNETIC WAVE RESISTIVITY INSTRUMENT WHILE DRILLING

(71) Applicant: Institute of Geology and Geophysics, Chinese Academy of Sciences, Beijing (CN)

(72) Inventors: Yali Zhang, Beijing (CN); Wenxiu Zhang, Beijing (CN); Wenxuan Chen, Houston, TX (US)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/453,696

(22) Filed: Aug. 22, 2023

(65) Prior Publication Data
US 2024/0151872 A1    May 9, 2024

(30) Foreign Application Priority Data
Nov. 4, 2022  (CN) .......................... 202211380425.0

(51) Int. Cl.
*G01V 3/28* (2006.01)
*E21B 47/024* (2006.01)

(52) U.S. Cl.
CPC .............. *G01V 3/28* (2013.01); *E21B 47/024* (2013.01)

(58) Field of Classification Search
None
See application file for complete search history.

(56) References Cited

U.S. PATENT DOCUMENTS

| 10,655,463 | B2 | 5/2020 | Wu et al. | |
| 10,680,633 | B1* | 6/2020 | Healy | H03M 1/089 |
| 2006/0173364 | A1* | 8/2006 | Clancy | A61B 5/307 |
| | | | | 600/509 |

(Continued)

FOREIGN PATENT DOCUMENTS

| CN | 102704921 A | 10/2012 |
| CN | 104727812 A | 6/2015 |

(Continued)

OTHER PUBLICATIONS

Zheng Zhong et al.; Orthogonal Frequency Division Multiplexing While Drilling Data Transmission Method, System, Storage Medium and Application; CN 111786927 A; Date Published Oct. 16, 2020; Qingdao Tuozhun Measurement and Control Tech Co Ltd; Univ China Petroleum East China; CPC H04B11/00 (CN) (Year: 2020).*

*Primary Examiner* — Nasima Monsur
(74) *Attorney, Agent, or Firm* — Seed IP Law Group LLP

(57) ABSTRACT

A signal acquisition method of an azimuthal electromagnetic wave resistivity instrument includes receiving, by a receiving antenna, a magnetic induction signal after formation attenuation, and converting the received magnetic induction signal into an electrical signal; amplifying, by a preamplifier circuit, a fixed gain of a received signal with nV level amplitude induced on the receiving antenna; controlling a filtering circuit to filter the amplified signal; amplifying the filtered signal using a programmable amplifier circuit to generate a target signal; and conducting digital conversion for the target signal that meets the requirements of low-frequency acquisition.

1 Claim, 2 Drawing Sheets

(56) References Cited

U.S. PATENT DOCUMENTS

2008/0278169 A1* 11/2008 Bittar .................. G01V 3/28
324/333

FOREIGN PATENT DOCUMENTS

| CN | 104747176 A | 7/2015 |
| CN | 104929622 A | 9/2015 |
| CN | 106884652 A | 6/2017 |
| CN | 107609530 A | 1/2018 |
| CN | 110374579 A | 10/2019 |
| CN | 114737961 A | 7/2022 |

* cited by examiner

SIGNAL ACQUISITION METHOD AND DEVICE OF AZIMUTHAL ELECTROMAGNETIC WAVE RESISTIVITY INSTRUMENT WHILE DRILLING

TECHNICAL FIELD

The present invention relates to the technical field of oil and gas geological exploration and measurement, in particular to a signal acquisition method and device of an azimuthal electromagnetic wave resistivity instrument while drilling.

BACKGROUND ART

As the conventional oil and gas exploration and development enters the middle and late stage, more and more complex oil and gas resources need to be developed by high-angle wells or horizontal wells to improve yield and benefits, wherein the logging while drilling technology is an indispensable important means of oil and gas exploration and development of the high-angle wells and horizontal wells, is mainly used for geological guidance and formation evaluation, and becomes one of the irreplaceable technologies in the current petroleum exploration and development. This technology obtains formation evaluation information such as lithology, saturation and porosity during drilling, provides drilling engineering parameters for effective drilling of reservoirs, and carries out logging work under harsh borehole conditions, and thus has advantages in many aspects.

As one of the important instruments for geological guidance and formation evaluation, the azimuthal electromagnetic wave resistivity instrument while drilling has a basic working principle that one or more axial transmitting antennas are used to transmit electromagnetic wave signals of different frequencies to the earth. The electromagnetic wave signals propagate along the direction of borehole and around the borehole respectively. Due to different absorption effects of different resistivity formations on electromagnetic waves, the electromagnetic wave signals propagated and attenuated along the direction of borehole may carry formation parameter information. By measuring the amplitude ratio and the phase difference of a plurality of axial receiving antennas at different distances from the transmitting antennas, the formation resistivity parameters can be obtained through inversion to evaluate the oiliness of the formation. At the same time, when the electromagnetic wave signals propagating around the borehole encounter a formation boundary, the signals are reflected through the formation boundary and received by horizontal or oblique antennas which have an angle with the axial direction. Combined with the azimuth information of the instrument, the distance and the direction of the formation boundary relative to the instrument can be accurately judged, so as to adjust a trajectory and carry out geological guidance.

The azimuthal electromagnetic wave resistivity instrument while drilling generally uses high transmission frequencies from a few hundred kHz to a few MHz, such as 400 kHz or 2 MHz. According to Nyquist sampling theorem, the sampling frequency of an analog-digital converter (ADC) should not be less than twice of the highest frequency of the measured signal in order to recover the measured signal without distortion. At the same time, in order to ensure the accuracy of acquisition, the actual sampling frequency is generally much higher than twice of the highest frequency of the measured signal.

The traditional high frequency signal acquisition method generally adopts superheterodyne frequency-mixing mode or selects an ADC chip with high sampling rate. The superheterodyne frequency-mixing mode is to mix the frequencies of the measured signal and a local oscillating signal to obtain a high frequency signal and an intermediate frequency signal at two frequencies, and then select the intermediate frequency signal through band-pass filtering, so as to realize down frequency conversion processing of the high frequency measured signal. The frequency of the intermediate frequency signal is less than ½ of the maximum sampling rate of the ADC selected by the instrument, which satisfies the Nyquist sampling theorem and can retain the amplitude and phase information of the measured signal, thereby ensuring the measurement accuracy of the high frequency measured signal. An ADC chip with a sampling rate more than twice of the measured frequency can directly sample the amplified and filtered measured signal, and the sampled signal can be stored or processed by a subsequent digital circuit.

When the azimuthal electromagnetic wave resistivity instrument while drilling detects the formation boundary, the signal is very weak, usually in the nV level, so higher requirements are proposed for a signal conditioning circuit and an acquisition circuit. When the above superheterodyne frequency-mixing mode is used for down frequency conversion processing of the measured signal, a frequency mixer and a filtering hardware circuit will be introduced into the acquisition circuit, which will introduce complex system noise, reduce the signal-to-noise ratio of the signal and increase the power consumption of the instrument. However, the ADC chip with high sampling rate can meet the sampling requirements of the high frequency signal, but have certain disadvantages in cost and accuracy. The ADC chips of the same accuracy level are generally more expensive with higher sampling rate. Higher sampling rate brings more data and also increases the cost of the whole system. Moreover, speed and accuracy of the ADC are often contradictory, so blindly pursuing high sampling rate may inevitably lose measurement accuracy.

SUMMARY OF THE INVENTION

The purpose of the present invention is to provide an acquisition method and device of receiving signals of an azimuthal electromagnetic wave resistivity instrument while drilling, so as to realize the sampling of high frequency signals at a low sampling frequency, improve the signal-to-noise ratio of the measured signal, improve the detection ability of the azimuthal electromagnetic wave resistivity instrument while drilling for high frequency weak signals, and reduce the power consumption of the instrument.

The technical solution of the present invention is: a low frequency acquisition method of an azimuthal electromagnetic wave resistivity instrument while drilling comprises:

step 1. picking up, by a receiving antenna, a magnetic induction signal after formation attenuation, and converting the received magnetic induction signal into an electrical signal for subsequent circuit processing;

step 2. amplifying, by a preamplifier circuit, the fixed gain of a weak signal with nV level amplitude induced on the receiving antenna; and using, by the preamplifier circuit, a three-operational amplifier instrument amplifier to realize high input impedance and eliminate common mode interference;

step 3. controlling a filtering circuit through a controller, and filtering the amplified signal, wherein the filtering circuit comprises an analog switch and two low pass filters with different frequencies, and for receiving signals with different frequencies, an FPGA controller achieves the selection of the filtering frequency by controlling on/off of the analog switch;

step 4. amplifying the filtered signal using a programmable amplifier circuit, wherein the programmable amplifier circuit comprises a multiplexer and an amplifier, and an FPGA realizes the control of the feedback resistance of the amplifier by controlling the multiplexer, to realize a gain-adjustable amplifier circuit and meet the sampling requirements of an analog-digital converter circuit; and step 5. conducting digital conversion for the measured signal that meets the requirements by means of low-frequency acquisition by the analog-to-digital conversion circuit under the control of the FPGA.

According to another aspect of the present invention, a signal acquisition device of an azimuthal electromagnetic wave resistivity instrument while drilling is provided, which comprises a receiving antenna, a preamplifier circuit, a filtering circuit, a programmable amplifier circuit, an analog-to-digital conversion circuit and a controller.

The preamplifier circuit adopts a three-operational amplifier instrument amplifier, and the structure has high input impedance, and inhibits common mode interference;

The controller uses the FPGA to realize the flexible control of the filtering circuit, the programmable amplifier circuit and the analog-to-digital conversion circuit;

The filtering circuit has a dual-frequency selection function, and the filtering frequency is selected through the control of the analog switch by the FPGA.

The programmable amplifier circuit is controlled by the FPGA, and the feedback resistance of the connected amplifier is controlled by the multiplexer to achieve the purpose of programmable gain.

The analog-to-digital conversion circuit uses a low frequency acquisition technology to detect the amplitude and the phase of high frequency signals.

The low frequency acquisition satisfies the condition: $qf_s = pf_0$, where p and q are integers not less than 2, and q>p. The recovery of signals to be sampled is realized by selecting the appropriate p and q.

Beneficial Effects

The existing azimuthal electromagnetic wave resistivity instrument while drilling is limited by the highest sampling frequency of the ADC, and generally adopts the superheterodyne mode to conduct down frequency conversion processing for the signals of a receiving coil, and then samples the signals after obtaining the low and medium frequency signals, or selects the ADC chip with high sampling rate to realize the recovery of the measured signal. The superheterodyne mode increases complexity and power consumption of the circuit, and introduces extra noise. The ADC chip with high sampling rate increases the sampling cost and loses the sampling accuracy. The low frequency acquisition technology of the present invention can avoid the above disadvantages, and recover the amplitude and the phase of the measured signal at a low sampling rate, which not only can reduce the requirements on the sampling rate of the ADC chip, but also can simplify the circuit structure, improve the signal-to-noise ratio level of the instrument and reduce the power consumption of the instrument.

DETAILED DESCRIPTION OF THE INVENTION

Technical solutions in embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

According to embodiments of the present invention, the present invention discloses a signal acquisition method of an azimuthal electromagnetic wave resistivity instrument while drilling, which is used for collecting high frequency weak signals.

Figure 1:
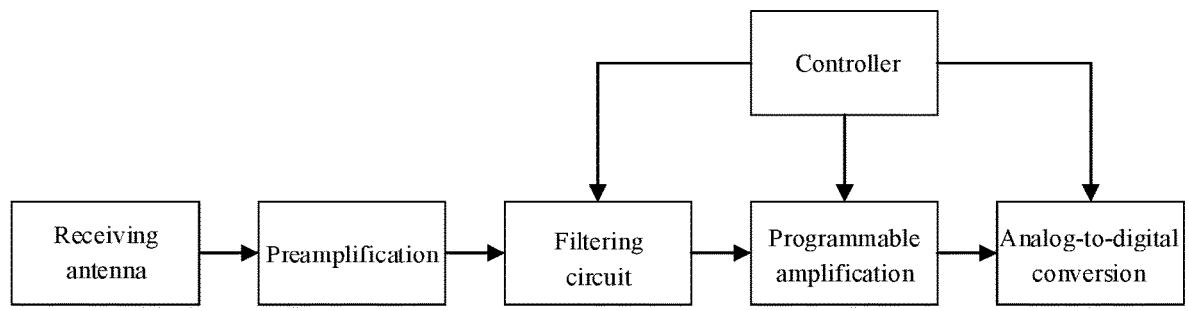
FIG. 1 shows an acquisition and processing process of a receiving signal of an azimuthal electromagnetic wave resistivity instrument while drilling.

As shown in FIG. 1, a signal acquisition circuit of the azimuthal electromagnetic wave resistivity instrument while drilling comprises a receiving antenna, a preamplifier circuit, a filtering circuit, a programmable amplifier circuit, an analog-to-digital conversion circuit and a controller, wherein a processing and acquisition process of a magnetic field signal in any channel is shown in FIG. 1: The receiving antenna is used for picking up a magnetic induction signal after formation attenuation or boundary reflection, and converting the received magnetic induction signal into an electrical signal for subsequent circuit processing.

The preamplifier circuit amplifies the fixed gain of a weak signal with nV level amplitude induced on the receiving antenna using a three-operational amplifier instrument amplifier, and this circuit structure can realize high input impedance, eliminate common mode interference and amplify the weak signal on the receiving antenna with very small error.

The controller uses a field programmable gate array (FPGA) to realize the sequential control of the filtering circuit, the programmable amplifier circuit and the analog-to-digital conversion circuit.

The filtering circuit comprises an analog switch and two low pass filters with different frequencies, and for receiving signals with different frequencies, an FPGA controller achieves the selection of the filtering frequency by controlling on/off of the analog switch.

The programmable amplifier circuit comprises a multiplexer and an amplifier, and an FPGA realizes the control of the feedback resistance of the amplifier by controlling the multiplexer, to realize a gain-adjustable amplifier circuit and meet the sampling requirements of an analog-digital converter circuit.

The analog-to-digital conversion circuit conducts digital conversion for the measured high frequency signal that meets the requirements by means of low-frequency acquisition under the control of the FPGA.

According to the embodiments of the present invention, the low frequency acquisition method refers to an acquisition technology of recovering the amplitude and the phase of the measured signal without distortion by selecting a sampling frequency lower than the Nyquist sampling rate.

The relationship between sampling frequency $f_s$ adopted by the low frequency acquisition method and the frequency $f_0$ of the measured signal satisfies: $qf_s=pf_0$, where p and q are positive integers not less than 2, and q>p;

A method of restoring the amplitude A and phase φ of the measured signal using the low frequency acquisition technology comprises the following steps:
a. Designing the sampling frequency $f_s$ according to the frequency $f_0$ of the measured signal, wherein the $f_s$ shall satisfy $qf_s=pf_0$, p and q are integers not less than 2, and q>p;
Specifically, the sampling frequency $f_s$ and the target signal frequency $f_x$ which can recover the amplitude and the phase without distortion satisfy $$f_x = f_0 - nf_s = \frac{a}{p}f_s;$$

n is the largest integer of $$\frac{q}{p}, \frac{q}{p} = n + \frac{a}{p},$$

and a is a positive integer less than p.
b. Sampling the measured signal within a target signal period $T_x$ using the sampling frequency $f_s$ to obtain a discrete sequence x[k], wherein k is a kth sampling point within corresponding sampling time and k is an integer between 0 and p−1;
Specifically, the period $$T_x = \frac{1}{f_x},$$

and $f_x$ is the target signal frequency of the recovered signal after low frequency acquisition.
c. Transmitting the discrete sequence x[k] obtained from low frequency acquisition to the FPGA controller for storage and processing by a subsequent digital circuit.

The low frequency acquisition technology realizes the digital processing of high frequency signals without the use of the ADC chip with high sampling rate, saves sampling cost, does not need complex hardware circuit, and improves the signal-to-noise ratio level.

In this design, with an example that the receiving antenna receives weak signals with frequencies of 400 kHz and 2 MHz, a technical solution of low frequency acquisition provided in this patent is further elaborated.

Figure 2:
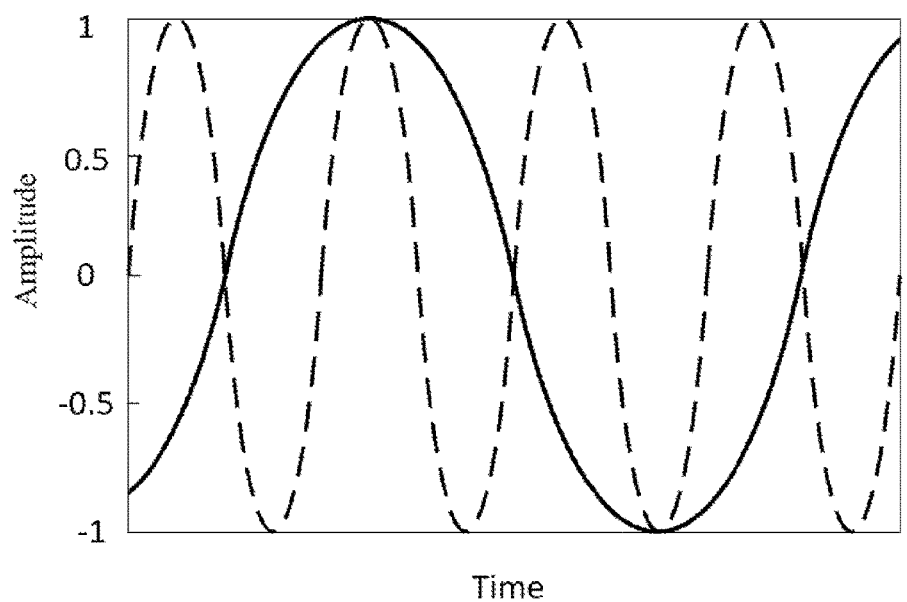
FIG. 2 is a schematic diagram of a low frequency acquisition technology.

The specific working principle of the low frequency acquisition technology is shown in FIG. 2. In the figure, a dashed line signal is a measured high frequency signal, and a solid line signal is a low frequency acquisition recovered signal. The solid line signal can recover the amplitude and the phase of the measured signal without distortion. After low frequency acquisition, the amplitude and the phase can be recovered by calculation.

In the low frequency acquisition technology, the determination of the sampling frequency is the key of the present invention. If the amplitude and the phase of the measured signal are restored without distortion, one of the basic conditions of the low frequency acquisition technology needs to be satisfied: $qf_s=pf_0$. Where p and q are integers not less than 2 and q>p; $f_0$ is the frequency of the measured signal, and $f_s$ is the sampling frequency $f_0>nf_s$ is set; $f_x=f_0-nf_s$; n is a largest integer value not greater than $$\frac{q}{p}, \frac{q}{p} = n + \frac{a}{p},$$

and a is a positive integer less than p. This can obtain:

$$f_x = f_0 - nf_s = \frac{a}{p}f_s$$

$f_x$ is a target signal frequency of low frequency acquisition results, and $f_s$ is a low frequency sampling frequency.
A measured analog signal can be expressed as:

$$S(t)=A\cos(2\pi f_0 t+\varphi)$$

A, $f_0$ and φ are the amplitude, the frequency and the phase of the measured signal respectively. If the sampling frequency of $f_s$ is used for sampling, a discretized digital signal can be obtained:

$$S(k) = A\cos\left(2\pi\left(n + \frac{a}{p}\right)f_s \times \frac{k}{f_s} + \varphi\right) = A\cos\left(\frac{2\pi ak}{p} + \varphi\right)$$

In this design, the recovered signal with the target frequency of $f_x$ is sampled at 8 points per cycle, that is, p=8. The p and q values of the measured signal at 400 kHz and 2 MHz can be calculated according to the basic conditions of low frequency acquisition. However, it should be noted that the calculated p and q values may not be unique for the low frequency acquisition technology at a fixed frequency. In order to facilitate the control of the ADC chip by the FPGA controller and avoid the frequent switching of the analog-to-digital conversion circuit caused by the sampling frequency $f_s$ corresponding to the measured signals of different frequencies, the same sampling frequency $f_s$ is used here for low frequency acquisition of the measured signals of 400 kHz and 2 MHz respectively, and $f_s$=128 kHz is taken uniformly. Therefore, on the premise that the sampling frequency is determined, q value corresponding to 400 kHz signal can be 25 and q value corresponding to 2 MHz signal can be 125 through a large amount of data analysis. Through further calculation, a value corresponding to 400 kHz signal is 1 and a value corresponding to 2 MHz signal is 5, i.e.:

$f_0$=400 kHz, $f_s$=128 kHz, p=8, q=25, a=1, $f_s$=128 kHz, $f_x$=16 kHz;

$f_0$=2 MHz, f=128 kHz, p=8, q=125, a=5, $f_s$=128 kHz, $f_x$=80 kHz.

After the p and a values are determined, the discretized digital signal S(k) is further analyzed.

When $p = 8$ and $a = 1$, $S_1(k) = A\cos\left(\frac{\pi k}{4} + \varphi\right)$;

When $p = 8$ and $a = 5$, $$S_5(k) = A\cos\left(k\pi + \frac{\pi k}{4} + \varphi\right) = (1-1)^k A\cos\left(\frac{\pi k}{4} + \varphi\right).$$

$S_1(k)$ represents $S(k)$ when a value is 1 and p value is 8, and $S_5(k)$ represents $S(k)$ when a value is 5 and p value is 8. By comparing $S_1(k)$ with $S_5(k)$, $S_1$ and $S_5$ are recovered signals. It can be found that $S_1(k)=(-1)^k S_5(k)$, that is, when a=5, a target signal with the same frequency as that when a=1 can be recovered by inverting symbol bits of the sampling points in odd positions. The discrete target signal retains the amplitude and the phase of the measured analog signal S(t). Therefore, for the measured signal of 2 MHz, the symbol bits of the sampling points in the odd positions are inverted in this design, to convert the target signal frequency from 80 kHz to 16 kHz, which is the same as the target frequency of 400 kHz. In this way, the ADC chip can be configured to digitize two measured signals at the same sampling frequency, thereby avoiding the frequent control of the FPGA controller on the analog-to-digital conversion circuit and simplifying the complexity of codes.

Figure 3:
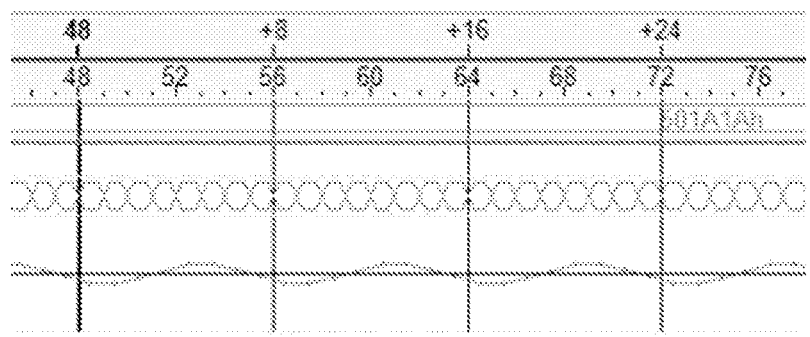
FIG. 3 shows a recovered signal obtained after low frequency acquisition.

According to the above analysis, a sampling clock of 128 kHz is arranged inside the FPGA controller, and is used to configure an analog-to-digital conversion module to realize the low frequency acquisition of the measured analog signals of 400 kHz and 2 MHz. The discrete data after low frequency acquisition is processed and calculated by the FPGA. FIG. 3 below shows recovered signals obtained by a logic analyzer in the FPGA. The sampling frequency set by the logic analyzer is 128 kHz, and there are 8 sampling points between every two time bars. The target signal with a frequency of 16 kHz can be recovered from FIG. 3, thereby realizing the low frequency acquisition of the high frequency signals.

Illustrative specific embodiments of the present invention are described above to facilitate those skilled in the art to understand the present invention. However, it should be understood that the present invention is not limited to the scope of the specific embodiments. For those ordinary skilled in the art, as long as various changes are within the spirit and scope of the present invention defined and determined by the attached claims, these changes are obvious. All inventions which utilize the conception of the present invention are protected.

The invention claimed is:

1. A signal acquisition method of an azimuthal electromagnetic wave resistivity instrument while drilling, characterized by comprising:

step 1. receiving, by a receiving antenna, a magnetic induction signal after formation attenuation, and converting the received magnetic induction signal into an electrical signal for subsequent circuit processing;

step 2. amplifying, by a preamplifier circuit, a fixed gain of a weak signal of the magnetic induction signal with nV level amplitude induced on the receiving antenna; and using, by the preamplifier circuit, a three-operational amplifier instrument amplifier to realize high input impedance and eliminate common mode interference;

step 3. controlling a filtering circuit through a controller to filter the amplified signal, wherein the filtering circuit comprises an analog switch and two low pass filters with different frequencies for receiving signals with different frequencies, and the controller includes a field programmable gate array (FPGA) controller configured to select a filtering frequency by controlling on/off of the analog switch;

step 4. amplifying the filtered signal using a programmable amplifier circuit to generate a target signal, wherein the programmable amplifier circuit comprises a multiplexer and an amplifier circuit, and the FPGA controller is configured to adjust a feedback resistance of the amplifier circuit by controlling the multiplexer, so as to adjust a gain of the programmable amplifier circuit and meet sampling requirements of an analog-digital converter circuit; and step 5. conducting digital conversion for the target signal that meets the sampling requirements by means of low-frequency acquisition by the analog-to-digital conversion circuit under control of the FPGA controller, wherein the low frequency acquisition includes:

(1) determining a sampling frequency fs according to a frequency f0 of the target signal, wherein fs satisfies qf_s=pf_0, p and q are integers not less than 2, and q>p;

(2) sampling the target signal within a target signal period T_x using the sampling frequency fs to obtain a discrete sequence x[k], wherein k is a kth sampling point within corresponding sampling time and k is an integer between 0 and p−1; the period T_x=1/f_x, and f_x is a target signal frequency of a recovered signal after the low frequency acquisition; and (3) transmitting the discrete sequence x[k] obtained from the low frequency acquisition to the FPGA controller for storage and processing by a subsequent digital circuit, and wherein the sampling the target signal includes:

(S1) determining p, q, and a values according to the sampling frequency $f_s$, wherein:

$f_0 > nf_s$;

$f_x = f_0 - nf_s$, n is a largest integer value not greater than $$\frac{q}{p}, \frac{q}{p} = n + \frac{a}{p},$$

a is a positive integer less than p;

$$f_x = f_0 - nf_s = \frac{a}{p}f_s;$$

and the target signal is expressed as $S(t)=A\cos(2\pi f_0 t+\varphi)$;

(S2) in response to the sampling frequency $f_s$ is used for sampling obtaining a discretized digital signal by:

$$S(k) = A\cos\left(2\pi\left(n + \frac{a}{p}\right)f_s \times \frac{k}{f_s} + \varphi\right) = A\cos\left(\frac{2\pi ak}{p} + \varphi\right)$$

wherein A and φ are an amplitude and a phase of the target signal, respectively;

(S3) analyzing a characteristic of the discretized digital signal S(k) according to the determined p and a values; and (S4) calculating the amplitude A and the phase φ of the target signal.

* * * * *